United States Patent [19]

Hillig et al.

[11] Patent Number: 4,769,349

[45] Date of Patent: * Sep. 6, 1988

[54] CERAMIC FIBER CASTING

[75] Inventors: William B. Hillig, Ballston Lake; Henry C. McGuigan, Schenectady, both of N.Y.

[73] Assignee: General Electric Company, Schenectady, N.Y.

[*] Notice: The portion of the term of this patent subsequent to Jan. 13, 2004 has been disclaimed.

[21] Appl. No.: 937,272

[22] Filed: Dec. 3, 1986

[51] Int. Cl.$^4$ ............................................. C04B 35/76
[52] U.S. Cl. ............................ 501/95; 264/DIG. 19
[58] Field of Search ......................... 264/65, DIG. 19; 501/95

[56] References Cited

U.S. PATENT DOCUMENTS

| | | | |
|---|---|---|---|
| 2,693,668 | 11/1954 | Slayter | 264/DIG. 19 |
| 3,047,383 | 7/1962 | Slayter | 264/DIG. 19 |
| 3,250,833 | 5/1967 | Wagner | 264/DIG. 19 |
| 3,298,897 | 1/1967 | Shannon | 501/95 |
| 3,736,159 | 5/1973 | Gibson et al. | 264/DIG. 19 |
| 3,883,359 | 5/1975 | Harvey | 106/98 |
| 3,905,047 | 9/1975 | Long | 501/153 |
| 4,314,852 | 2/1982 | Brennan et al. | 501/95 |
| 4,399,231 | 8/1983 | Prewo et al. | 501/95 |
| 4,402,750 | 9/1983 | Okamura et al. | 501/95 |
| 4,440,864 | 4/1984 | Campbell | 501/95 |
| 4,464,192 | 8/1984 | Layden et al. | 264/125 |
| 4,485,179 | 11/1984 | Brennan et al. | |
| 4,529,630 | 7/1985 | Schmidt et al. | 428/454 |
| 4,543,113 | 9/1985 | Forester et al. | 501/95 |
| 4,543,345 | 9/1985 | Wei | 501/95 |
| 4,544,610 | 10/1985 | Okamoto et al. | 428/611 |
| 4,558,016 | 12/1985 | Bronson et al. | 501/95 |
| 4,585,500 | 4/1986 | Minjolle et al. | 501/95 |
| 4,588,699 | 5/1986 | Brennan et al. | 501/95 |
| 4,615,987 | 10/1986 | Chyung et al. | 501/95 |
| 4,636,480 | 1/1987 | Hillig | 501/87 |

OTHER PUBLICATIONS

J. V. Milewski, "Efficient Use of Whiskers in the Reinforcement of Ceramics", Advanced Ceramic Materials, vol. 1, No. 1, 1986, pp. 36–41.

Primary Examiner—William R. Dixon, Jr.
Assistant Examiner—Andrew B. Griffis
Attorney, Agent, or Firm—Jane M. Binkowski; James C. Davis, Jr.; James Magee, Jr.

[57] ABSTRACT

A process for producing a slip cast ceramic body which comprises preparing a slip comprised of a suspension of ceramic material in a liquid vehicle, said ceramic material being comprised of a mixture of whiskers and particulates wherein the volume ratio of whiskers to particulates ranges from about 1:5 to about 1:1, said ceramic material being present in an amount greater than 4% by volume of the slip, said whiskers being present in an amount greater than about 2% by volume of said slip, and casting the slip in a porous mold.

7 Claims, No Drawings

CERAMIC FIBER CASTING

This invention relates to a ceramic fiber-containing casting slip and to the forming of a slip cast body.

Because of geometric interference, rod-like materials (whiskers) do not pack well, but tend to form hedgehog-like balls ("fuzzballs"). This typically occurs when stirring or mixing even slightly concentrated suspensions of whiskers, or when agitating dry whiskers as during sieving. Usually, it is necessary to disperse whiskers in very dilute suspensions in order to separate them, and then to handle them as little as possible to avoid the reformation of fuzzballs. Such dilute suspensions of whiskers are not useful for producing dense bodies, i.e. greater than about 25% by volume of solids, by slip casting. By reducing the aspect (length-to-diameter (L/D)) ratio of the whiskers, greater packing in the suspension is possible before pilling occurs. However, such reduction often degrades the desired property benefit from the fibers.

The present invention provides a process for producing a suspension of fine ceramic whiskers that allows simple, hollow and/or complex shapes to be formed by slip casting. The slip cast body is useful for producing a ceramic composite comprised of a continuous matrix phase and a discontinuous filler phase. Specifically, the slip cast body can be infiltrated with a molten ceramic to produce a composite wherein it comprises the filler or reinforcing phase and the infiltrant forms the matrix phase.

Briefly stated, the present casting slip is comprised of ceramic material suspended in a liquid vehicle, said ceramic material being comprised of fibers and particulates, said fibers having an aspect ratio ranging from about 10 to less than about 200 and being selected from the group consisting of aluminum oxide, beryllium oxide, silicon carbide, silicon nitride, titanium carbide, zirconium carbide and a mixture thereof, at least about 90% by volume of said particulates being filler particulates selected from the group consisting of aluminum oxide, beryllium oxide, silicon carbide, silicon nitride, titanium carbide, zirconium carbide and a mixture thereof, from 0 to about 10% by volume of said particulates being comprised of a ceramic material which has a melting point ranging from about 1000° C. to about 100° C. below the melting or decomposition point of said fibers and filler particulates and in its molten state wets said fibers and filler particulates, the volume ratio of said fibers to said particulates ranging from about 1:5 to about 1:1, said particulates having a diameter ranging from greater than about 0.2 μ to less than about 3 μ, said ceramic material being present in an amount greater than about 4% by volume of said slip, said ceramic fibers being present in an amount greater than about 2% by volume of said slip.

By "particulates" it is meant herein particles wherein the ratio of the largest to the smallest dimension is less than about 10. Also, the largest dimension of the particulates should be less than about ½ of the length of the fibers used in the present invention. Ceramic material in other forms such as for example, flakes, is not useful in the present invention.

By "fiber" or "ceramic fiber" herein, it is meant short fiber, chopped fiber, whisker and mixture thereof. The present fiber can be crystalline, amorphous or a mixture thereof. Specifically, short or chopped fibers can be crystalline or amorphous and the whiskers are crystalline.

Generally, the present ceramic fiber has an aspect ratio ranging from about 10 to less than about 200, and preferably from about 20 to less than about 100. Generally, the ceramic fiber may range in diameter from about 0.2 micron to about 10 microns, and preferably from about 0.5 micron to about 10 microns. It may range in length from about 10 microns to about 2000 microns, and preferably from about 20 microns to about 1000 microns.

The present ceramic fiber is selected from the group consisting of aluminum oxide, beryllium oxide, silicon carbide, silicon nitride, titanium carbide, zirconium carbide and a mixture of said fibers.

The ceramic particulates used in the present casting slip have a diameter ranging from greater than about 0.2 micron to less than about 3 microns. By diameter of a particulate herein it is meant equivalent diameter which is the diameter of a sphere which occupies the same volume as does the particulate. Generally, particulates outside this range do not produce useful slips. The particulates can be amorphous, crystalline or a mixture thereof.

At least about 90% by volume, and frequently about 100% by volume, of the total volume of ceramic particulates is comprised of filler particulates selected from the group consisting of aluminum oxide, beryllium oxide, silicon carbide, silicon nitride, titanium carbide, zirconium carbide and a mixture thereof.

From 0 to about 10% by volume, frequently from about 1% by volume to about 5% by volume, of the total volume of ceramic particulates can be comprised of a meltable ceramic, which is an in situ matrix forming material, i.e. it generally is of substantially the same composition as the molten ceramic used to infiltrate the present slip cast body to form a composite. This in situ matrix-forming material has a melting point ranging from a minimum of about 1000° C. to a maximum of about 100° C. below the melting or decomposition point of the fibers and filler particulates, and preferably from about 1400° C. to about 2000° C. but at least about 100° C. below the melting or decomposition point of the fibers or filler particulates. When molten, it wets the fibers and filler particulates, i.e. it forms a contact or wetting angle of less than 90° with the fibers and filler particulates. During infiltration of the slip cast body, the in situ matrix-forming material is molten and wets the fibers and filler particulates sufficiently to significantly promote infiltration of the externally introduced matrix-forming infiltrant.

The present in situ matrix-forming materials can have the same composition as the infiltrants disclosed in copending Ser. No. 759,815 filed July 29, 1985 for "Composite By Infiltration" for W. B. Hillig, assigned to the assignee hereof and incorporated herein by reference. Specifically, the in situ matrix-forming material can be selected from the group consisting of barium fluoride, calcium fluoride, magnesium fluoride, strontium fluoride, cerium fluoride, dysprosium fluoride, gadolinium fluoride, lanthanum fluoride, samarium fluoride and yttrium fluoride.

The present in situ matrix-forming materials can have the same composition as the infiltrants disclosed in copending Ser. No. 803,172 filed Dec. 2, 1985 for "Composite By Infiltration" for W. B. Hillig, assigned to the assignee hereof and incorporated herein by reference. Specifically, the in situ matrix-forming material can be an alkaline earth silicate represented in terms of its oxidic constituents, i.e. MO and $SiO_2$, by the general formula of $xMO \cdot zSiO_2$ wherein M=Ba, Ca, Mg, Sr and a mixture thereof, and where x is 1, 2 or 3 and z is 1, 2 or 3. The in situ matrix-forming material also can be an alkaline earth aluminosilicate represented in terms of its oxidic constituents, i.e. M'O, $Al_2O_3$ and $SiO_2$, by the general formula $xM'O \cdot yAl_2O_3 \cdot zSiO_2$ where M'=Ba, Ca, Mg, Sr and a mixture thereof, where x is 1, 2, 4 or 6, y is 1, 2, 5 or 9 and z is 1, 2 or 5. Each oxidic constituent can range up to ±50%, preferably less than ±10%, from its stoichiometric composition.

The liquid vehicle used in forming the slip is a liquid under ambient conditions in which the ceramic material can be effectively dispersed. Generally, the liquid vehicle is one which evaporates away at ambient pressure or under a partial vacuum at a temperature ranging from about ambient to about 100° C. leaving no residue or no residue detectable by x-ray diffraction analysis. Preferably, the liquid vehicle has a boiling point ranging from greater than about 30° C. to about 100° C. at ambient pressure. Representative of suitable liquid vehicles are water, methyl alcohol, ethyl alcohol, isopropyl alcohol and a mixture thereof.

Frequently, a deflocculant is used in forming the slip. The deflocculant can be an organic or inorganic material and should be soluble in the liquid vehicle. The deflocculant need only be used in an amount which effectively aids in dispersing the ceramic material and such amount is determinable empirically. Generally, the deflocculant is used in an amount of less than about 5% by volume of the total volume of liquid vehicle. The deflocculant should be a material which can be volatilized away from the slip cast body at a temperature ranging from ambient to about 600° C. leaving no amount thereof detectable by x-ray diffraction analysis. Representative of useful deflocculants are oleic acid and tetramethyl ammonium hydroxide.

As used herein the term 37 slip" includes suspension and slurry.

The amount of ceramic material used in forming the slip is greater than about 4% by volume, generally ranging from greater than about 5% by volume, to about 30% by volume of the total volume of slip. The amount of ceramic fibers in the slip is greater than about 2% by volume, preferably greater than about 4% by volume, of the total volume of slip. The ceramic material is at least significantly or substantially uniformly dispersed in the slip. The viscosity of the slip can be adjusted by adjusting the concentration of ceramic material therein. The slip is a pourable fluid under ambient conditions and preferably has the consistency of pourable heavy cream.

The volume ratio of fibers to particulates in the ceramic material ranges from about 1:5 to about 1:1, frequently from about 2:5 to about 4:5, and preferably it is about 1:3. The particular volume ratio of fibers to particulates is determinable empirically and depends largely on the aspect ratio of the fibers. Generally, the larger the aspect ratio of fibers, the larger are the spaces between them and the larger are the amounts of ceramic particulates required to produce the present slip. The particulates inhibit the reformation of fuzzballs.

The slip can be formed in a conventional manner by mixing all of its components generally at ambient temperature and pressure. Generally, the slip is formed by ball-milling the components provided the ball-milling has no significant deleterious effect on the fibers. Ultrasonic agitation can also be used, for example, by placing a container of the slip in a standard laboratory ultrasonic cleaning bath. The particulates assist in the breakdown of the fuzzballs of fibers during ball-milling or ultrasonic agitation.

In order to carry out the slip casting process, a porous mold is provided which is capable of extracting the liquid vehicle from the suspension. The liquid vehicle can be extracted by being absorbed by the porous mold generally under ambient conditions, or it can be extracted by vacuum drawing the liquid vehicle through the porous mold. The mold generally has an open top associated with a cavity or cavities. The interior surfaces of the mold conform to the exterior or forming surfaces of the body to be cast. The mold can be comprised of a single piece or a plurality of cooperating segments. It can be made of a variety of materials known in the art as useful for forming porous molds for slip casting and frequently it is plaster of paris.

The slip is poured into the mold cavity in the desired amount and the liquid vehicle is extracted therefrom. As the liquid vehicle is extracted, the solids of the slip are deposited on the mold interior surface. Slip casting can be continued until the walls of the cast body have the desired thickness or until the walls of the cast body meet the center to produce a solid casting.

The slip cast body can be recovered from the mold in a conventional manner. If the cast body is of simple convex shape, it can be lifted out of the mold. However, if it is of complex shape, it may be recovered by taking the molding apart or, if necessary, by dissolving or thermally decomposing the mold.

The slip cast body can be fired in air at a temperature ranging to about 600° C. to remove any non-ceramic material therein such as, for example, organic deflocculant which may not have been absorbed by the mold during slip casting.

The present slip cast body consists essentially of the ceramic material. It has an open porosity generally ranging from about 30% by volume to about 90% by volume, and frequently from about 40% by volume to about 80% by volume, of the cast body. It is useful for forming a solid ceramic composite. Specifically, it can be infiltrated with a molten ceramic to form a solid composite having a porosity of less than 10% by volume. Alternatively, the infiltrant can be introduced by chemical vapor impregnation. The infiltrant can have the same composition as that disclosed herein for the in situ matrix-forming material. The resulting solid composite is of substantially the same shape and size as the slip cast body which was infiltrated, or does not differ significantly in shape and size therefrom. The resulting composite has a variety of applications depending on its composition and shape. For example, it is useful as a gear or a structural support piece.

The invention is further illustrated by the following examples where the procedure was as follows unless otherwise stated:

The examples are illustrated in Table I.

Commercially available crystalline whiskers of silicon carbide were used in the given amount to form the slip. The whiskers used in Examples 1 and 2 had an aspect ratio ranging from about 15 to about 200, i.e. they ranged in length from about 10 microns to about 80 microns and ranged in diameter from about 0.45 micron to about 0.64 micron. The whiskers used in Examples 3–11 had an aspect ratio of about 40:1, i.e. a length mostly of about 10-20 microns and a diameter mostly of about 0.2 to about 0.5 micron.

Crystalline silicon carbide powder having the given equivalent diameter was used in the given amount to produce the slip. The ratio of the largest to the smallest dimension of the powders was less than about 10.

Water was used as the liquid vehicle in the given amount.

A mold release agent, i.e. an alginate sold under the trademark Keltex, was used in Examples 1-9. In Examples 1-5, the mold release agent was used in an amount of 1.8% by weight, and in Examples 6-9 it was 0.5% by weight, of the given amount of water.

In Examples 10 and 11, about 25% by volume of the liquid vehicle was ethanol, and based on the amount of liquid vehicle, about 1% by volume of tetramethylammonium hydroxide, about 1% by volume of oleic acid and about 0.6% by volume of an organic commercially available dispersant were used in forming the slips.

The slip of Examples 1-9 was formed by ball milling all of the components under ambient conditions in a plastic jar for the given milling time using 6 to 8 of 1 inch diameter porcelain milling balls. The slurries were too dilute for the ball milling to comminute the individual whiskers.

In Examples 1-9, a porous plaster of paris mold was used having an open top and a single cavity which allowed the formation of a cast body in the form of a strip.

In Examples 1-9, the slip was poured into the mold so as to fill it and the mold absorbed the liquid vehicle under ambient conditions.

In Examples 10-11, the mold was comprised of a ¼ inch thick rubber mat with areas thereof cut out deposited on a filter paper. The suspension was poured on the rubber mat filling the cut out areas and vacuum applied to the filter paper extracted the liquid vehicle leaving cast bodies in the cut out areas. The cast bodies were then allowed to dry under ambient conditions.

uniform pourable suspensions. In Examples 3 and 6 the slip had a consistency like thick cream and produced a uniformly thick casting, which on drying was strong. In Examples 10 and 11, the slips were syrup-like in consistency and were cast into substantially uniform thick walled shapes. The dried slip cast bodies of Examples 3, 6, 10 and 11 were lifted out of the molds. They were strong, self-supporting and would be useful for forming composites by infiltration of the open porosity therein with a molten ceramic. Scanning electron microscopic examination of the slip cast bodies of Examples 6 and 10 showed that the whiskers and particulates were uniformly distributed throughout.

In Example 1, the slip was too thick and fuzzballs remained.

In Example 2, the slip cast body cracked in the mold when dry indicating a non-homogeneous distribution of the whiskers in the slip as a consequence of an excessively large fiber aspect ratio.

In Examples 4 and 5, the dried slip cast bodies were too weak to be handlable because the largest dimension of a significant portion of the particles was more than one half the length of the whiskers.

In Examples 7-9, the dried slip cast bodies were too weak to be handlable because of the small size of the particulates.

EXAMPLE 12

A layer of strontium silicate was deposited on the top face of the slip cast body of Example 3 in an amount sufficient to fill its open porosity.

The resulting structure was heated in carbon monoxide at a slightly reduced pressure to a temperature of about 1600° C. at which the strontium silicate was molten and at which it infiltrated the open porosity of the body. The infiltrated body was then allowed to cool to ambient temperature.

The resulting solid composite was comprised of a continuous matrix phase of strontium silicate and a dis-

TABLE 1

| Ex. No. | Whiskers Weight (g) | Powder Diameter (μ) | Powder Weight (g) | Water (g) | Milling Time | Slip % v/o Solids | Slip % v/o Fibers | Whiskers: Particles Volume Ratio | Open Porosity Cast Body | Comments |
|---|---|---|---|---|---|---|---|---|---|---|
| 1 | 20 | 0.8 | 80 | 140 | 1 hr | 18.2 | 3.6 | 1:4 | — | Too thick, fuzzballs remain |
| 2 | 50 | 0.8 | 150 | 400 | 15 hr | 13.5 | 3.4 | 1:3 | 54% | Good slip, shrinks + cracks when dry |
| 3 | 25 | 0.8 | 75 | 225 | 15 hr | 12.2 | 3.1 | 1:3 | 55% | Good slip, low shrinkage |
| 4 | 50 | 3.5 | 50 | 400 | 15 hr | 7.2 | 3.6 | 1:1 | 62% | Thick slip, weak when dry |
| 5 | 25 | 3.5 | 125 | 400 | 15 hr | 10.5 | 1.8 | 1:3 | 67% | Easily castable, weak when dry |
| 6 | 50 | 0.8 | 50 | 650 | 6 hr | 4.6 | 2.3 | 1:1 | 78% | Smooth slip, crack free + strong when dry |
| 7 | 40 | 0.2 | 40 | 650 | 6 hr | 3.7 | 1.9 | 1:1 | 78% | Easily castable weak when dry |
| 8 | 40 | 0.2 | 80 | 650 | 8 hr | 5.5 | 1.8 | 1:2 | 67% | Similar to slip of Example 7 |
| 9 | 40 | 0.2 | 120 | 650 | 10 hr | 7.1 | 1.8 | 1:3 | 59% | Slightly stronger than slip of Ex. 7 |
| 10 | 22 | 0.8 | 60 | 100 | ** | 20.0 | 5.4 | 1:2.7 | 58% | Good casting |
| 11 | 23 | 0.8 | 47 | 130 | ** | 14.4 | 4.8 | 1:2 | 64% | Good casting |

**Ultrasonically dispersed.

Examples 3, 6, 10 and 11 illustrate the present invention. The slips formed in Examples 3, 6, 10 and 11 were continuous phase of silicon carbide. It had an open porosity of less than 10% by volume. The shape and size of the composite were substantially the same as that of the slip cast body infiltrated. The composite would be useful as a structural support for use at temperatures below the melting point of strontium silicate.

EXAMPLE 13

The procedure of Example 12 was repeated with a slip cast body of Example 10 producing substantially the same results.

What is claimed is:

1. A process for producing a slip cast ceramic body having an open porosity ranging from about 30% by volume to about 90% by volume of said body which consists essentially of preparing a slip consisting essentially of ceramic material suspended in a liquid vehicle, said ceramic material consisting essentially of a mixture of fibers and particulates, said fibers having an aspect ratio ranging from about 10 to less than about 200 and being selected from the group consisting of aluminum oxide, beryllium oxide, silicon carbide, silicon nitride, titanium carbide, zirconium carbide and a mixture thereof, said particulates being filler particulates selected from the group consisting of aluminum oxide, beryllium oxide, silicon carbide, silicon nitride, titanium carbide, zirconium carbide and a mixture thereof, the volume ratio of said fibers to said particulates ranging from about 1:5 to about 1:1, said particulates having an equivalent diameter ranging from greater than about 0.2 $\mu$ to less than about 3 $\mu$, the ratio of the largest to the smallest dimension of said particulates being less than about 10 and the largest dimension of said particulates being less than about ½ of the length of said fibers, said ceramic material being present in an amount ranging from greater than about 4% by volume to about 30% by volume of the total volume of said slip, said fibers being present in an amount greater than about 2% by volume of the total volume of said slip, providing a porous mold, casting the slip into the mold to extract said liquid vehicle producing said slip cast body, and recovering said slip cast body, said slip cast body being of simple, hollow and/or complex shape, said slip cast body being useful in producing a ceramic composite which does not differ significantly in shape and size therefrom and which is comprised of a continuous matrix phase and a discontinuous filler phase, said slip cast body being characterizable as being infiltratable with molten ceramic infiltrant to produce said composite wherein said infiltrant forms said matrix phase.

2. The process according to claim 1 wherein said fibers have an aspect ratio ranging from about 20 to less than about 100.

3. The process according to claim 1 wherein said fibers are crystalline whiskers of silicon carbide.

4. The process according to claim 1 wherein said fibers are present in an amount greater than about 4% by volume of the total volume of said slip.

5. The process according to claim 1 wherein said liquid vehicle is selected from the group consisting of water, methyl alcohol, ethyl alcohol, isopropyl alcohol and a mixture thereof.

6. A self-supporting slip cast body consisting essentially of a mixture of ceramic fibers and ceramic particulates, said fibers having an aspect ratio ranging from about 10 to less than about 200 and being selected from the group consisting of aluminum oxide, beryllium oxide, silicon carbide, silicon nitride, titanium carbide, zirconium carbide and a mixture thereof, said particulates being filler particulates selected from the group consisting of aluminum oxide, beryllium oxide, silicon carbide, silicon nitride, titanium carbide, zirconium carbide and a mixture thereof, the volume ratio of said fibers to said particulates ranging from about 1:5 to about 1:1, said particulates having an equivalent diameter ranging from greater than about 0.2 $\mu$ to less than about 3 $\mu$, the ratio of the largest to the smallest dimension of said particulates being less than about 10 and the largest dimension of said particulates being less than about ½ of the length of said fibers, said body having an open porosity ranging from about 30% by volume to about 90% by volume of said body, said slip cast body being of simple, hollow and/or complex shape, said slip cast body being useful for producing a ceramic composite which does not differ significantly in shape and size therefrom and which is comprised of a continuous matrix phase and a discontinuous filler phase, said slip cast body being characterizable as being infiltratable with molten ceramic infiltrant to produce said composite wherein said infiltrant forms said matrix phase.

7. The body according to claim 6 wherein said fibers have an aspect ratio ranging from about 20 to less than about 100.

* * * * *